United States Patent [19]

Nakashima et al.

[11] Patent Number: 4,697,979
[45] Date of Patent: Oct. 6, 1987

[54] ROBOT SYSTEM SAFETY METHOD

[75] Inventors: Seiichiro Nakashima; Kenichi Toyoda; Shinsuke Sakakibara; Nobutoshi Torii, all of Tokyo, Japan

[73] Assignee: Fanuc Ltd., Minamitsuru, Japan

[21] Appl. No.: 782,714

[22] PCT Filed: Jan. 31, 1985

[86] PCT No.: PCT/JP85/00039

§ 371 Date: Sep. 23, 1985

§ 102(e) Date: Sep. 23, 1985

[87] PCT Pub. No.: WO85/03472

PCT Pub. Date: Aug. 15, 1985

[30] Foreign Application Priority Data

Jan. 31, 1984 [JP] Japan ................................ 59-015787

[51] Int. Cl.$^4$ .............................................. B25J 9/00
[52] U.S. Cl. ..................... 414/786; 180/2.1; 364/184; 364/513; 901/3; 901/6; 901/9; 901/49
[58] Field of Search ................. 414/786, 730; 901/49, 901/9, 6, 3; 364/513, 174, 184; 180/2.1, 271, 286

[56] References Cited

U.S. PATENT DOCUMENTS

| | | | |
|---|---|---|---|
| 3,774,217 | 11/1973 | Bonner et al. | 182/2 X |
| 4,379,335 | 4/1983 | Kirsch et al. | 901/9 X |
| 4,442,387 | 4/1984 | Lindbom | 901/49 X |
| 4,506,335 | 3/1985 | Magnuson | 364/513 |
| 4,535,207 | 8/1985 | Lindqvist | 901/49 X |

FOREIGN PATENT DOCUMENTS

| | | |
|---|---|---|
| 54-3761 | 1/1979 | Japan . |
| 58-109902 | 6/1983 | Japan . |
| 58-177296 | 10/1983 | Japan . |

Primary Examiner—Robert J. Spar
Assistant Examiner—Donald W. Underwood
Attorney, Agent, or Firm—Staas & Halsey

[57] ABSTRACT

A safety method in a robot system including at least a robot (1), peripheral equipment (2-5) serviced by the robot, a robot control unit (6) which causes the robot to execute predetermined services for the peripheral equipment, and a teach control panel (9). A door (11) is provided at the entrance to a robot operating zone, and the door is provided with a safety switch (12) for terminating automatic operation of the robot when the robot is in an automatic operating state. When the safety switch is actuated by opening the door, robot motion in the automatic operating state is decelerated and stopped. During the time that the safety switch is in the actuated state, the robot is placed in a playback operation state to enable control that is performed through the teach control panel.

7 Claims, 7 Drawing Figures

| REMOTE CHANGEOVER SWITCH ON/OFF | ON | | OFF | |
|---|---|---|---|---|
| MODE | REPEAT MODE | TEACH MODE | REPEAT MODE | TEACH MODE |
| ROBOT OPERATING STATE | AUTOMATIC OPERATING STATE | | PLAYBACK OPERATING STATE | TEACH STATE |

ROBOT SYSTEM SAFETY METHOD

BACKGROUND OF THE INVENTION

This invention relates to a robot system safety method and, more particularly, to a safety method for protecting an operator from a robot.

A playback-type robot performs a workpiece loading and unloading operation for machine tools, an automatic welding operation and other activities based on robot command data taught in advance. Since an industrial robot of this kind possesses considerable weight and operates at high speed, an individual may be struck and injured and, in extreme cases, injured fatally by the robot unless appropriate precautions are taken. Since an operator has many opportunities to work near a robot, the degree of danger is very high.

For this reason, safety measures for protecting an operator from a robot have been adopted in robot systems.

However, conventional safety methods are inadequate and accidents are caused by even the slightest operator carelessness.

SUMMARY OF THE INVENTION

An object of the present invention is to provide a robot system safety method capable of reliably protecting an operator from a robot.

Another object of the present invention is to provide a robot system safety method capable of decelerating and stopping a robot by sensing when an operator is about to penetrate the robot operating zone.

A further object of the present invention is to provide a robot system safety method whereby a robot in an automatic operating state can be moved by manipulating a teach control panel, even after the robot has been decelerated and stopped.

The present invention provides a safety method in a robot system including at least a robot, peripheral equipment serviced by the robot, a robot control unit which causes the robot to execute predetermined services for the peripheral equipment, and a teach control panel. A door is provided at the entrance to the robot operating zone, and the door is provided with a safety switch for terminating automatic operation of the robot in an automatic operating state. When the safety switch is actuated by opening the door, robot motion in the automatic operating state is decelerated and stopped. During the time that the safety switch is in the actuated state, the robot is placed in a playback operation state to enable control that is performed at the teach control panel. According to the present invention, the robot control unit senses that the operator is about to penetrate the robot operating zone before such penetration occurs and is capable of slowing down and stopping the robot, thus reliably protecting the operator from the robot.

DESCRIPTION OF THE PREFERRED EMBODIMENTS

Figure 1:
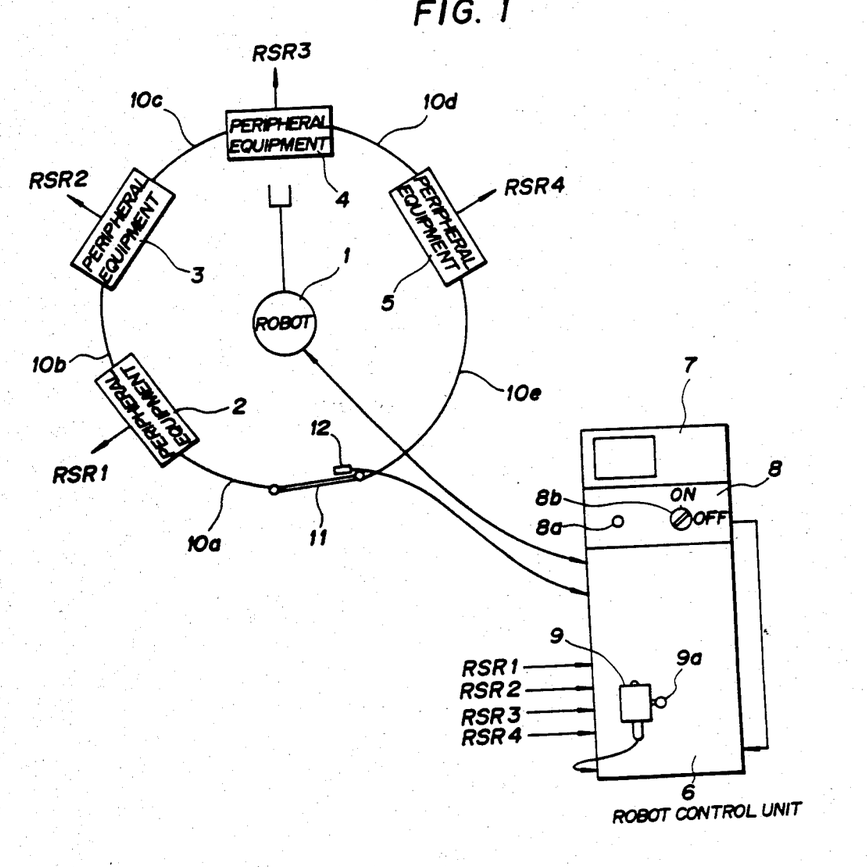
FIG. 1 is a schematic diagram of a robot system to which the present invention can be applied.

In FIG. 1, numeral 1 denotes a robot, and numerals 2-5 designate peripheral equipment such as machine tools or cells in which welding members are fixed to tables by jigs for receiving robot services. Numeral 6 denotes a robot 1 control unit for controlling the robot based on robot command data taught in advance. Shown at numeral 7 is a manual data input unit with a CRT (which unit is hereafter referred to as an MDI/CRT). Numeral 8 represents an operator's panel, and numeral 9 a portable (pendant-type) teach control panel.

Figure 5:
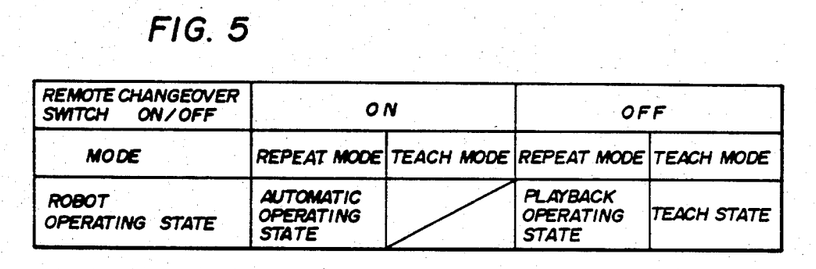
FIG. 5 is a chart for describing the relationship between mode and robot operating state.

The items of peripheral equipment 2, 3, 4, 5 are connected to the robot control unit via cables and respectively apply robot service request signals RSR1, RSR2, RSR3, RSR4 to the robot control unit 6. In an automatic operating state, the robot control unit 6 receives the request signals and controls the robot by performing predetermined processing on the basis of robot command data stored in an internal memory. The operator's panel 8 is provided with a start button 8a, remote changeover switch 8b and the like. If a repeat mode is established and the start button 8a is pressed with the remote changeover switch 8b in the ON position, an automatic operating state is established. From this point onward, the robot control unit 6 exercises robot control based on robot command data specified by the request signals from the peripheral equipment. If the repeat mode is established with the remote changeover switch 8b in the OFF position, on the other hand, the robot is capable of being controlled from the teach control panel 9 or MDI/CRT 7 (this being referred to as the playback operation state hereafter). Note that if a teach mode is established when the remote changeover switch 8b is in the OFF position, the robot can be taught from the teach control panel 9 or MDI/CRT (referred to as the teach state). However, if the teach mode is established with the remote changeover switch 8b in the ON position, operation of the teach control panel and MDI/CRT is ignored by the robot control unit 6. FIG. 5 shows the relationship between the ON/OFF state of the remote changeover switch and the robot operating state with regard to mode.

Figure 2:
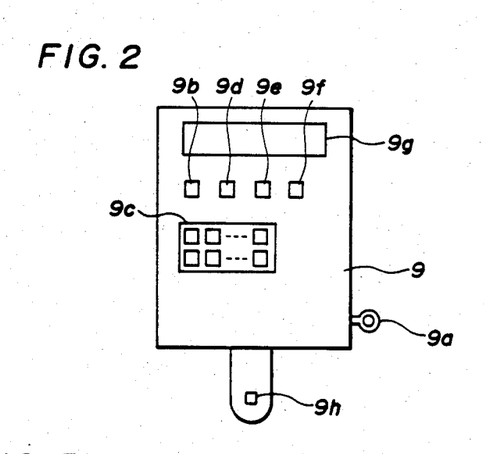
FIG. 2 is a schematic diagram of a teach control panel.

As shown in FIG. 2, the teach control panel 9 is provided with an enable switch 9a for enabling operation of the teach control panel, a mode selection switch 9b, various jog keys 9c, a back key 9d, forward key 9e, move key 9f and a display section 9g, etc. The enable switch 9a is a locking-type key. When the enable switch 9a is operational, the mode selection switch 9b is capable of selecting the repeat or teach mode. In the teach and playback operating states, the various jog keys 9c are capable of jog-feeding the robot. After the forward key 9e and move key 9f are pressed simultaneously, the robot can be moved in accordance with robot command data as long as one of these keys is pressed. After the back key 9d and move key 9f are pressed simultaneously, the robot 1 can be moved backward in single-block motion in accordance with robot command data as long as one of these keys is pressed. Note that the handle of the teach control panel 9 is provided with a deadman switch 9h actuated when the operator grasps the teach control panel 9. When the deadman switch is turned off with the enable switch 9a in the on state, namely when the operator releases the teach control panel 9, for example, as the result of being surprised, the robot comes to an emergency stop.

The MDI/CRT 7 is provided with various keys and is capable of selecting a mode when the enable switch 9a of teach control panel 9 is off. In the teach state, the MDI/CRT 7 is capable of editing robot command data and, in the playback operation state, is capable of effecting robot playback.

Fences 10a–10e are provided so as to surround the robot operating zone, a door 11 is provided at the entrance to the robot operating zone, and a safety switch 12 operated by opening and closing the door 11, is provided. If the door 11 is opened when the robot 1 is servicing a prescribed item of peripheral equipment in the automatic operating state, the safety switch 12 is actuated and the robot control unit 6 immediately decelerates and stops the robot.

Figure 3:
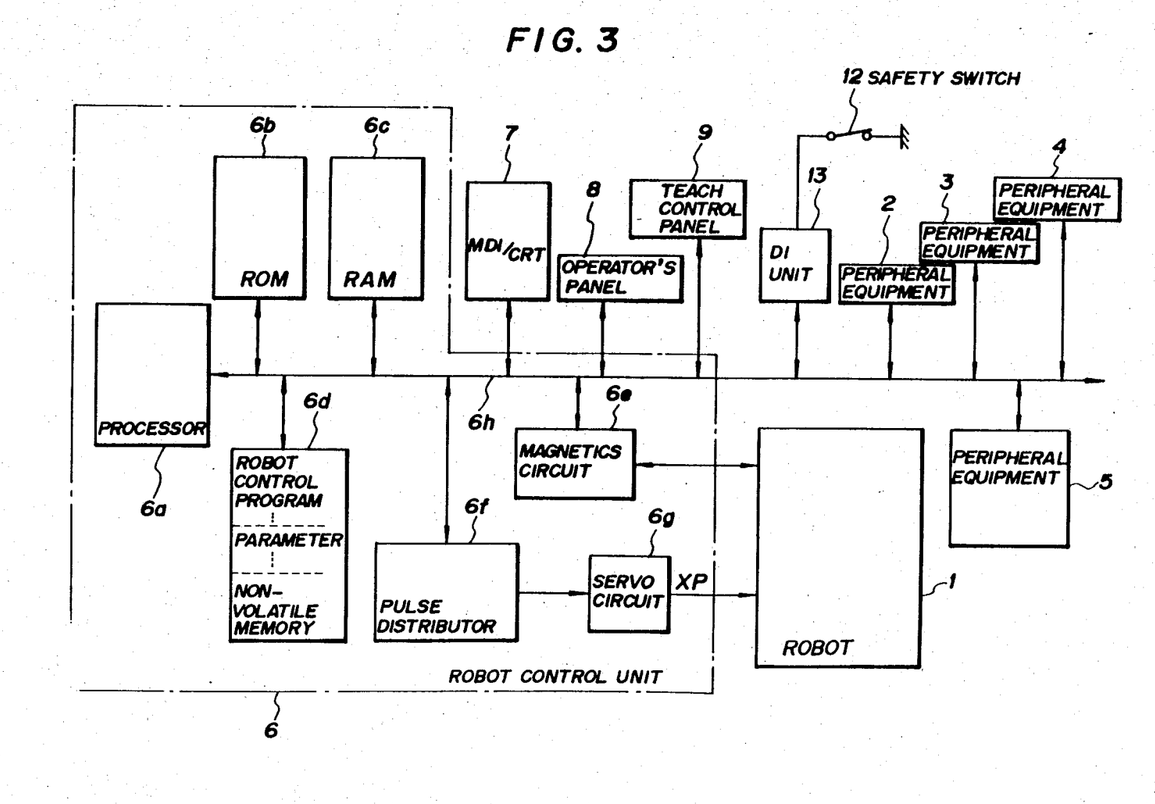
FIG. 3 is a block diagram of a robot control unit used in the present invention.

As shown in FIG. 3, the robot control unit 6 has a processor 6a, a ROM 6b storing a control program, a RAM 6c for storing various data, a non-volatile memory 6d, a magnetics circuit 6e for performing an exchange of data with the robot 1, a pulse distributor 6f, and a servo circuit 6g. The various items of peripheral equipment 2-5, the MDI/CRT 7, operator's panel 8, teach control panel 9 and data input unit (DI unit) 13 are interconnected via a bus line 6h. Stored beforehand in the non-volatile memory 6d by a teaching operation are various parameters and robot command data for the peripheral equipment.

It should be noted that an override value for stipulating clamping velocity serves as a parameter in relation to the present invention. The robot operates at a velocity obtained by multiplying a commanded velocity and a set override value together. When the safety switch 12 has been actuated, however, the playback operating velocity and jog-feed velocity of the robot do not exceed a value set by the parameter, and the operating velocity is thus clamped, even if the override value is increased.

The operation of the robot system according to the present invention will now be described. Note that the step numbers referred to hereinbelow specify the corresponding blocks in FIGS. 4(A) and 4(B).

Figure 4A:
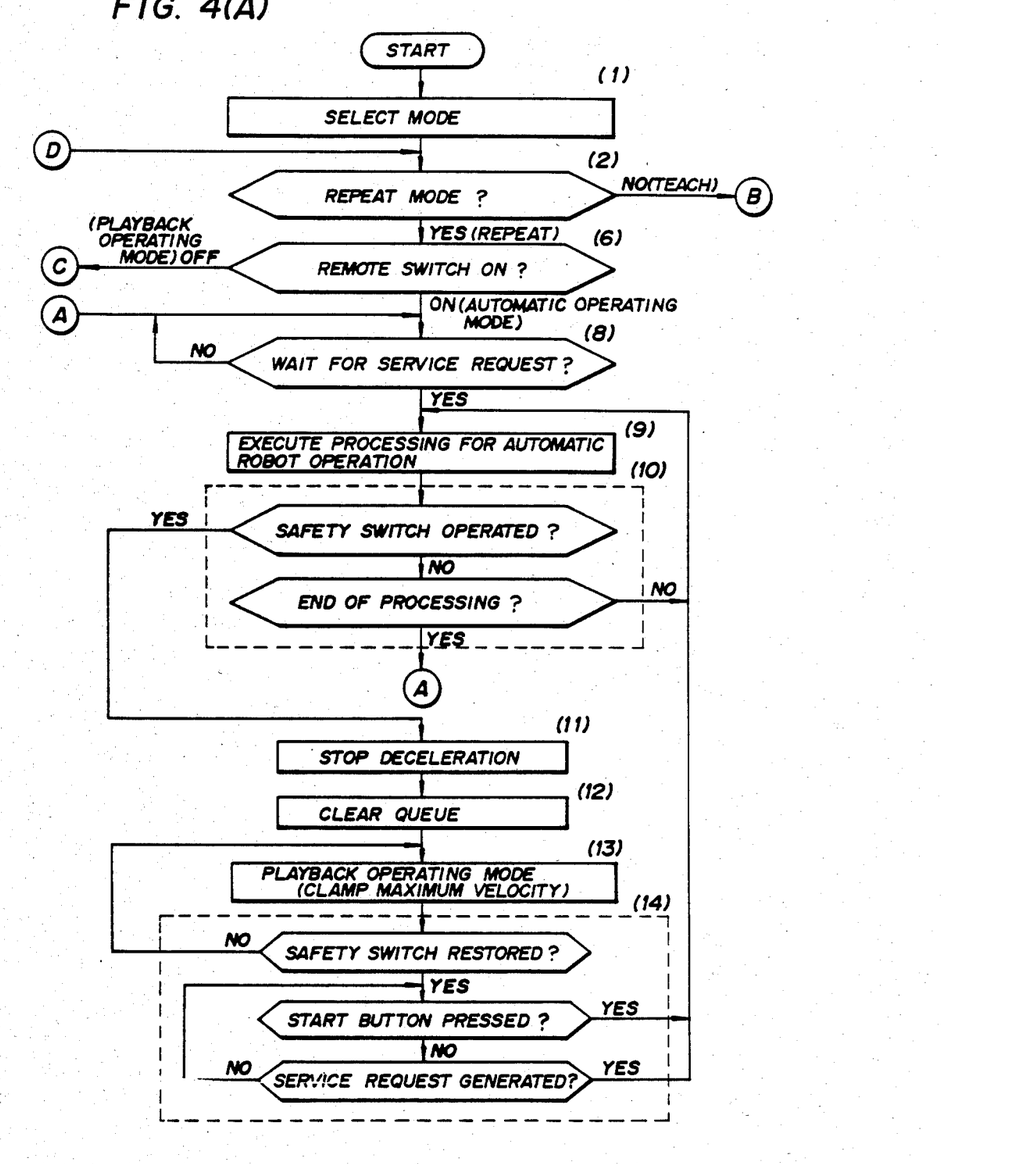
FIGS. 4(A) and 4(B) form a flowchart for processing according to the method of the present invention.
Figure 4B:
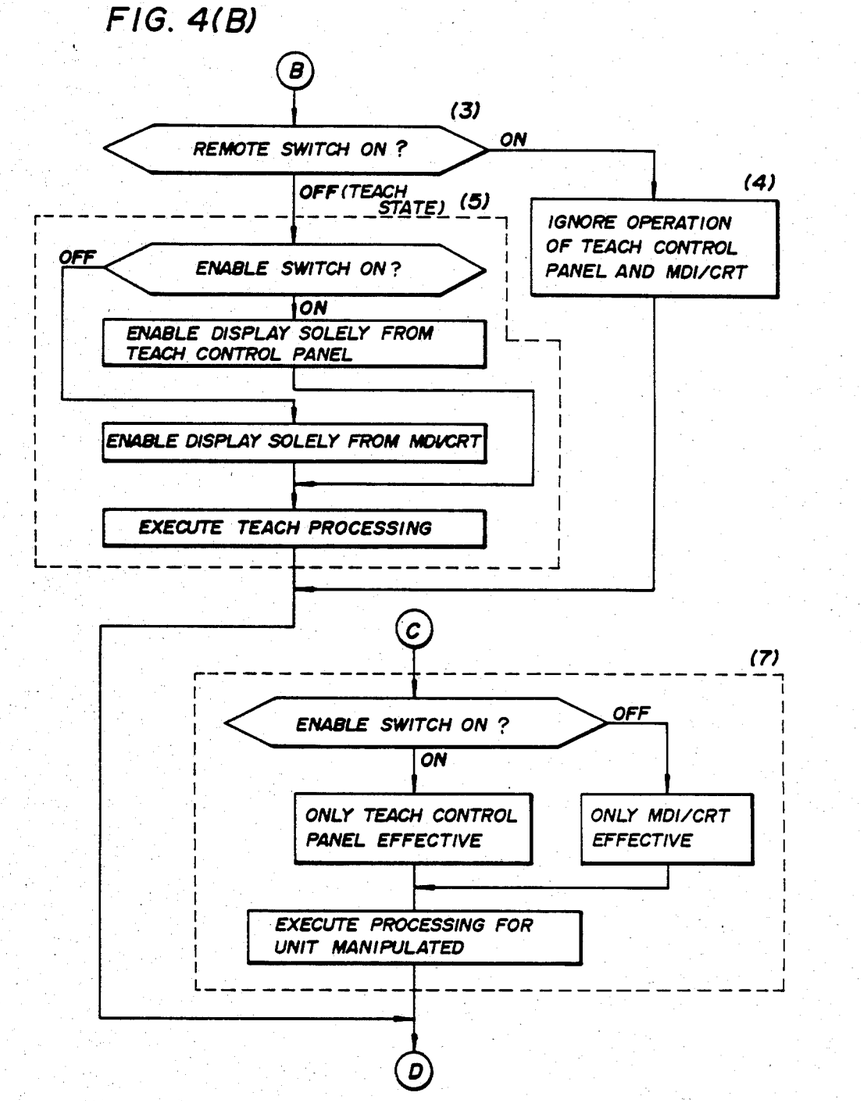

(1) First, a mode is selected by the MDI/CRT 7 and the remote changeover switch 8b of the operator's panel 8 is set to the on or off position.

(2) After reading the mode and the on or off state of the remote changeover switch 8b, the processor 6a determines whether the mode is the repeat mode or teach mode.

(3) If the mode is the teach mode, the processor determines whether the remote changeover switch 8b is in the on or off state.

(4) If the remote changeover switch 8b is in the on state in the teach mode, manipulation of the teach control panel 9 and MDI/CRT 7 is thenceforth ignored. Naturally, automatic operation and playback operation are impossible.

(5) If the remote changeover switch 8b is in the off position in the teach mode, the teach state is recognized. Thereafter, the processor 6a reads operation signals from the teach control panel 9 or MDI/CRT 7, depending upon the on or off state of the enable switch 9a, and executes teach processing. Specifically, a teach operation can be performed using the teach control panel 9 when the enable switch 9a is in the on state, and such editing as modification and deletion of robot command data can be performed using the MDI/CRT 7 when the enable switch 9 is in the off state.

(6) If the mode is the repeat mode at step (2), the processor 6a determines whether the remote changeover switch 8b is on or off.

(7) If the remote changeover switch 8b is off in the repeat mode, the processor 6a recognizes the playback operation state and thereafter reads operation signals from the teach control panel 9 or MDI/CRT 7 and executes playback operation processing.

Specifically, if the enable switch 9a is in the on state, playback operation processing is carried out in accordance with operation commands from the teach control panel 9. If, by way of example, a jog button for a prescribed axis provided on the teach control panel 9 is pressed, the following jog-feed processing is performed:

Assume that jog-feed velocity is represented by F, that the override value set by the teach control panel 9 is R, and that a jog button for the +X axis is pressed. The processor 6a will then calculate robot motion velocity Fj, which takes the override value into account, in accordance with the equation $$Fj = F \cdot R \quad (1)$$

and will thereafter obtain an incremental value $\Delta X$, indicative of a distance to be travelled, at intervals of $\Delta T$ sec (e.g., 8 msec) in accordance with the equation $$\Delta X = Fj \cdot \Delta T \quad (2)$$

with $\Delta X$ being applied to the pulse distributor 6f as long as the jog button is pressed. The pulse distributor 6f executes a pulse distribution calculation based on $\Delta X$ to generate distributed pulses Xp that are applied to the servo circuit 6g. As a result, the robot 1 is moved along the +X axis at the velocity Fj. The processor 6a updates an X-axis present position Xa, which is stored in the RAM 6c, every $\Delta T$ sec in accordance with the expression $$Xa + \Delta X \rightarrow Xa \quad (3)$$

(8) If the remote changeover switch 8b is in the ON position in the repeat mode, then the processor 6a recognizes the automatic operating state and subsequently performs automatic operation processing.

In the automatic operating state, the processor 6a receives the service request signals RSR1–RSR4 from the items of peripheral equipment 2-5 and, in the order in which the service request signals RSR1–RSR4 are generated, performs predetermined robot control processing in accordance with the robot command data stored in the non-volatile memory 6d. It should be noted that the service request signals RSR1–RSR4 generated by the peripheral equipment are queued in the RAM 6c in the order in which they are produced.

When the automatic operating state is attained, the processor 6a checks the queue in RAM 6c and determines whether a service request is being generated by an item of peripheral equipment.

(9) If a service request is not being generated, the processor waits until one is generated. When a service request is generated, robot data corresponding to the first service request signal in the queue are read out of the non-volatile memory 6d and stored in the RAM 6c.

Thereafter, robot control processing is performed by reading the robot command data out of the RAM one block at a time. Note that the first service request signal is deleted from the queue, after which the next service request signal becomes the first service request signal. As a result, the robot 1 is moved along a predetermined path in accordance with path data contained in the robot command data, and service conforming to the robot service data is executed for the peripheral equipment at a predetermined position. For example, if an item of peripheral equipment is a machine tool, a service such as the loading and unloading of a workpiece or the changing of a tool is performed. If an item of peripheral equipment is a cell including a table on which a welding member is placed, welding along a welding path is performed with respect to the welding member. Path control is performed as described below. For the sake of the description, we shall assume that the controlled axes are three in number, namely the X, Y and Z axes.

The processor 6a finds incremental values $X_i$, $Y_i$, $Z_i$ along the respective axes based on the target position, which is inclined in the path data, and the present position stored in the RAM 6c. Then, based on the incremental values along these axes, the commanded velocity F and the override value R, the processor 103 obtains travelling quantities $\Delta X$, $\Delta Y$, $\Delta Z$, which are to be traversed along the respective axes in a period of time $\Delta T$ sec, from equations $$\Delta X = X_i \cdot F \cdot R \cdot \Delta T / \sqrt{X_i^2 + Y_i^2 + Z_i^2} \quad (4)$$

$$\Delta Y = Y_i \cdot F \cdot R \cdot \Delta T / \sqrt{X_i^2 + Y_i^2 + Z_i^2}$$

$$\Delta Z = Z_i \cdot F \cdot R \cdot \Delta T / \sqrt{X_i^2 + Y_i^2 + Z_i^2}$$

These are applied to the pulse distributor 6f every $\Delta T$ sec. On the bases of $\Delta X$, $\Delta Y$, $\Delta Z$, the pulse distributor 6f performs a pulse distribution calculation to generate distributed pulses along each axis, these being applied to the servo circuit 6g. As a result, the robot is moved along the commanded path. The processor 6a, in accordance with the following formulae, updates the present position $X_a$, $Y_a$, $Z_a$ along the respective axes every $\Delta T$ sec, $X_a$, $Y_a$, $Z_a$ having been stored in RAM 6c:

$$X_a \pm \Delta X \to X_a, Y_a \pm \Delta Y \to Y_a, Z_a \pm_{66} Z \to Z_a \quad (5)$$

Further, in accordance with the following formulae, the processor updates remaining traveling distances $X_r$, $Y_r$, $Z_r$ (the initial values of which are the incremental values $X_i$, $Y_i$, $Z_i$, respectively):

$$X_r - \Delta X \to X_r, Y_r - \Delta Y \to Y_r, Z_r - \Delta Z \to Z_r \quad (6)$$

When the following condition is established:

$$X_r = Y_r = Z_r = 0 \quad (7)$$

the processor reads the next item of robot command data out of RAM 6c and executes robot control in a similar manner. It should be noted that the processor 6a delivers outputs to the robot 1 via the magnetics circuit 6e with regard to service codes (S codes) contained in the robot command data.

(10) In parallel with the above-described robot control processing, the processor 6a constantly checks whether the safety switch 12 has been actuated. In other words, the processor 6a constantly checks whether the door 11 has been opened. If the door is not opened, robot control processing continues in accordance with the robot command data. When robot control processing ends, robot command data conforming to the first service request signal in the queue are read out of the non-volatile memory 6d, and robot control processing is repeated.

(11) If the door is opened while the robot is sevicing a prescribed item of peripheral equipment in the automatic operating state, the safety switch is actuated. This is sensed immediately by the processor 6a via the DI unit 13.

When the safety switch 12 is actuated, the processor 6a immediately slows down and stops the robot 1. This slow-down and stopping operation is performed by terminating the $\Delta X$, $\Delta Y$, $\Delta Z$ inputs to the pulse distributor 6f. Specifically, when the $\Delta X$, $\Delta Y$, $\Delta Z$ inputs to the pulse distributor 6f are terminated, motors (not shown) for the various axes are subsequently stopped after being moved by an amount corresponding to a servo delay, stored in an error register (not shown), of servo circuit 6g.

(12) When the safety switch 12 is actuated, the processor 6a clears the service request signal queue stored in the RAM 6c.

(13) After the safety switch 12 is actuated, the processor 6a regards this as indicating the playback operation state and thenceforth performs playback operation processing, in response to an operation command from the teach control panel 9 or MDI/CRT 7, without accepting service request signals. However, since the fact that the door 11 has been opened is taken as indicating that playback operation is being performed at a time that the operator is in the robot operating zone, the maximum velocity of the robot during this playback operation is clamped to a fixed value for the sake of safety. In other words, in a case where a jog-feed is performed, the override value will not exceed the fixed value even if the override value R in Eq. (1) or the override value R of Eq. (4) in playback operation based on the robot command data is set to a value greater than the fixed value. The maximum velocity is thus clamped. Note that the fixed value is stored beforehand as a parameter in the non-volatile memory 6d for playback operation based on jog feed and for playback operation based on robot command data.

In the playback operating state established by turning on the safety switch 12, playback operation by using the teach control panel 9 is enabled but playback operation by using the MDI/CRT 7 is not, only when the enable switch 9a is on, just as in the playback operating state in the case where the remote changeover switch 8b is off in the repeat mode. This is to prevent the danger of the robot being moved by an individual inadvertently performing a playback operation by using the MDI/CRT 7 while the operator is manipulating the robot from inside the robot operating zone (i.e., while the enable switch 9a is on).

(14) When the operator finishes the prescribed manipulations inside the robot operating zone, leaves the robot operating zone and closes the door 11, the safety switch 12 is restored. The restoration of safety switch 12 is immediately sensed by the processor 6a, which thenceforth recognizes that the automatic operating state has been established. Accordingly, if the start button 8a provided on the operator's panel 8 is pressed, the processor 6a resumes the interrupted robot control processing in accordance with the robot command data stored in RAM 6c. In a case where the robot was in the course of being moved by the playback operation using the robot command data, automatic operation is restarted from the position occupied at such time by pressing the start button 8a.

If an item of peripheral equipment generates a service request signal, the processor 6a executes robot control processing in accordance with the service request signal, even if the start button 8a is not pressed.

Figure 6:
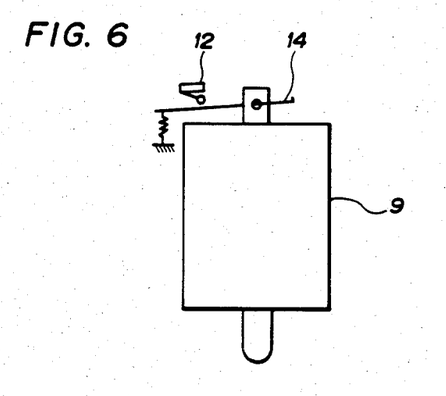
FIG. 6 is a view for describing another arrangement of a safety switch.

In the foregoing description, the safety switch 12 is provided on the door. However, in a case where no door is provided, an arrangement can be adopted in which the safety switch 12 is provided on a hook 14 from which the portable teach control panel 9 is hung, as shown in FIG. 6. The safety switch is actuated by removing the teach control panel 9 from the hook 14 and restored by hanging the teach control panel 9 on the hook 14.

According to the present invention as described above, a safety switch for halting the operation of a robot in an automatic operating state is provided on a door at the entrance to a robot operating zone or on a hook from which a portable teach control panel is hung, and the robot is slowed down and stopped when the switch is actuated. Accordingly, as long as the operator attemps to manipulate the robot while holding the teach control panel within the robot operating zone, the safety switch is actuated and there is absolutely no danger. Note that the operator always holds the teach control panel in cases where he attempts to enter the robot operating zone during automatic operation.

Further, according to the present invention, the arrangement is such that when the enable switch 9a is on in the teach state or playback operation state, control effected solely by the teach control panel 9 and not by the MDI/CRT, is enabled. Therefore, the robot cannot be moved by manipulating the MDI/CRT, even if the operator is manipulating the robot inside the robot operating area by using the teach control panel (i.e., the enable switch is on). Hence, there is absolutely no danger. Moreover, according to the present invention, when the playback operation state is established due to actuation of the safety switch, the maximum value of playback operation velocity is clamped to a predetermined value. Consequently, the robot will not move at a velocity unanticipated by the operator during the playback operation based on the robot command data. This makes it possible to greatly diminish the degree of danger.

What is claimed is:

1. A safety method for a robot system including at least a robot, peripheral equipment serviced by the robot, a robot control unit which causes the robot to execute predetermined services for the peripheral equipment in accordance with a robot control program, a teach control panel which can be operated to select a repeat mode and a teach mode and to move the robot, and a manual data input unit with a CRT which can also be operated to select the repeat mode and the teach mode and to move the robot, comprising the steps of:

(a) providing a safety switch for terminating automatic operation of the robot when the robot is in an automatic operating state, providing a remote changeover switch for determining the operating state of the robot, and providing an enable switch on the teach control panel for enabling operation of the teach control panel and the manual data input unit alternately;

(b) establishing the automatic operation of the robot by selecting the repeat mode and by placing the remote changeover switch in the ON position;

(c) decelerating and stopping robot motion in the automatic operating state when the safety switch is actuated, so that the robot is placed in a playback operating state; and (d) enabling control from the teach control panel only while the safety switch remains in the actuated state and the enable switch is in the ON position, and enabling control from the manual data input unit only when the safety switch remains in the actuated state and the enable switch is in the OFF position.

2. A robot system safety method according to claim 1, wherein a door is provided at an entrance to a robot operating zone, further comprising the step of actuating the safety switch when the door is opened.

3. A robot system safety method according to claim 1, wherein the teach control panel is portable, further comprising the step of actuating the safety switch when the teach control panel is moved from a predetermined location.

4. A robot system safety method according to claim 1, further comprising the step of clamping robot travelling velocity to a preset velocity when the safety switch is actuated.

5. A robot system safety method according to claim 4, further comprising the step of presetting data specifying the clamping velocity beforehand in a non-volatile memory of the robot control unit.

6. A robot system safety method according to claim 5, wherein the preset data is an override value.

7. A robot system safety method according to claim 1, wherein an operator's panel is provided outside a robot operating zone, further comprising the step of restarting automatic operation by operating a start button, which is provided on the operator's panel, after the safety switch is restored to a non-actuated state.

* * * * *

UNITED STATES PATENT AND TRADEMARK OFFICE
CERTIFICATE OF CORRECTION

PATENT NO. : 4,697,979

DATED : OCTOBER 6, 1987

INVENTOR(S) : SEIICHIRO NAKASHIMA ET AL.

It is certified that error appears in the above-identified patent and that said Letters Patent is hereby corrected as shown below:

FRONT PAGE [57] ABSTRACT, line 1, "in" should be --for--.

Col. 5, line 22, "inclined" should be --included--;
line 47, eq. 5, "$\pm_{66}^{\phantom{6}}Z$" should --$\pm_{\Delta}^{\phantom{\Delta}}Z$--.

Col. 6, line 9, "sevicing" should be --servicing--.

Signed and Sealed this

Fifth Day of April, 1988

*Attest:*

DONALD J. QUIGG

*Attesting Officer*      *Commissioner of Patents and Trademarks*